United States Patent
Eleftheriou et al.

(10) Patent No.: US 7,522,367 B2
(45) Date of Patent: Apr. 21, 2009

(54) ASYNCHRONOUS READ CHANNEL SHAPED TOWARD GENERALIZED PARTIAL RESPONSE CHARACTERISTICS

(75) Inventors: Evangelos S. Eleftheriou, Zurich (CH); Sedat Oelcer, Kilchberg (CH); Robert Allen Hutchins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 11/286,553

(22) Filed: Nov. 23, 2005

(65) Prior Publication Data

US 2007/0115574 A1    May 24, 2007

(51) Int. Cl.
  *G11B 5/035*  (2006.01)
  *G11B 5/09*   (2006.01)
  *G11B 20/10*  (2006.01)
(52) U.S. Cl. .......................................... 360/65; 360/39
(58) Field of Classification Search ........................ None
  See application file for complete search history.

(56) References Cited

U.S. PATENT DOCUMENTS

| | | |
|---|---|---|
| 5,621,769 A | 4/1997 | Wan et al. |
| 5,784,415 A | 7/1998 | Chevillat et al. |
| 5,852,524 A | 12/1998 | Glover et al. |
| 5,881,075 A | 3/1999 | Kong et al. |
| 5,917,863 A | 6/1999 | Soichi et al. |
| 6,021,011 A | 2/2000 | Behrens et al. |
| 6,104,766 A | 8/2000 | Coker et al. |
| 6,158,027 A | 12/2000 | Bush et al. |
| 6,246,733 B1 | 6/2001 | Hutchins |
| 6,460,150 B1 | 10/2002 | Cideciyan et al. |
| 6,625,235 B1 | 9/2003 | Coker et al. |
| 6,650,491 B2 | 11/2003 | Suzuki et al. |
| 6,865,217 B2 | 3/2005 | Kaewell, Jr. |
| 2007/0047121 A1* | 3/2007 | Eleftheriou et al. ........... 360/51 |

FOREIGN PATENT DOCUMENTS

JP         6061787 A      3/1994

OTHER PUBLICATIONS

C.M. Melas et al., "An Asynchronous Fully Digital Channel for Magnetic Recording", IBM Research Division, Almaden Research Center, © 1994 IEEE, pp. 1144-1147.

(Continued)

*Primary Examiner*—Joseph H Feild
*Assistant Examiner*—Daniell L Negrón
(74) *Attorney, Agent, or Firm*—David W. Victor; Konrad Raynes & Victor LLP

(57) ABSTRACT

Provided is an asynchronous read channel shaped toward generalized partial response characteristics. The read channel is incorporated in a storage device to process signals read from a storage medium. An equalizer receives asynchronous input read signals and shapes the input read signals toward a desired fixed characteristic in an asynchronous time domain. An interpolator transforms the read signal from the equalizer in the asynchronous time domain to a synchronous time domain. A noise whitening filter processes the read signal shaped toward the desired fixed characteristic to produce an output read signal shaped towards a generalized partial response polynomial. A detector receives the read signal shaped towards the generalized partial response polynomial in the synchronous time domain to determine an output value comprising data represented by the input read signals.

9 Claims, 4 Drawing Sheets

OTHER PUBLICATIONS

F.M. Gardner, "Interpolation in Digital Modems-Part I: Fundamentals", IEEE Transactions on Communications, vol. 41, No. 3, Mar. © 1993, pp. 501-507.

E. Eleftheriou et al., "Noise-Predictive Maximum-Likelihood (NMPL) Detection for the Magnetic Recording Channel", IBM Research Division, Zurich Research Lab, Rüschlikon, Switzerland, pp. 556-560.

L. Du et al., "A Linearly Constrained Adaptive FIR Filter For Hard Disk Drive Read Channels", Cirrus Logic, Colorado, © 1997 IEEE, pp. 1613-1617.

J.D. Coker et al., "Noise-Predictive Maximum Likelihood (NMPL) Detection", IBM Storage Systems Division, Rochester, MN, and IBM Research Division, Zurich Research laboratory, Rüschlikon, Switzerland, IEEE Transactions on Magnetics, vol. 34, No. 1, Jan. © 1998, pp. 110-117.

S. Aviran et al., "Noise-Predictive Turbo Equalization for Partial-Response Channels", EP-03, pp. 1-3.

D. Berman et al., "Enhanced Linear Interpolation for Low Sampling Rate Asynchronous Channels", IBM Almaden Research Center and IBM Tucson, Arizona, © 2001 IEEE, pp. 3025-3028.

U.S. Application entitled "Read Channel Apparatus for Asynchronous Sampling and Synchronous Equalization", U.S. Appl. No. 11/213,127, filed Aug. 26, 2005, by inventors E.S. Eleftheriou, R.A. Hutchins, G.A.Jaquette, J.Jelitto, and S. Oelcer.

* cited by examiner

ASYNCHRONOUS READ CHANNEL SHAPED TOWARD GENERALIZED PARTIAL RESPONSE CHARACTERISTICS

BACKGROUND OF THE INVENTION

1. Field of the Invention

The present invention relates to an asynchronous read channel shaped toward generalized partial response characteristics.

2. Description of the Related Art

Magnetic tape cartridges include magnetic tape to store data to be saved and read back at a subsequent time. A magnetic tape drive writes the data to magnetic tape, typically as a set of parallel tracks, and subsequently a magnetic tape drive reads back the data. To read back the data, a magnetic tape drive typically comprises parallel read heads to read each of the parallel tracks, a drive system for moving a magnetic tape with respect to the read heads such that the read heads may detect magnetic signals on the magnetic tape, and a read channel for digitally sampling magnetic signals detected by the read heads and providing digital samples of the magnetic signals. The digital samples are then decoded into data bits, and the data bits from the parallel tracks are combined into the data that was saved. The read channel typically requires an equalizer for each of the read heads to compensate for the change in the signal due to the magnetic recording properties of the write head, the magnetic tape, and the read head. Magnetic tapes may be interchanged between tape drives, such that a magnetic tape written on one tape drive will be read by another tape drive. Variation in the response of the read heads to the variously written magnetic tapes may result in unacceptably poor read back of the recorded signals.

In order to achieve higher cartridge capacities and improved performance, advances in several technical areas are necessary. A real density increase, i.e. increase in linear and/or track density, is key to achieving higher storage capacities. Increasing a real density decreases the distance between adjacent bit cells leading to an increase in intersymbol-interference (ISI). Higher track density also implies narrower track width, narrower write/read heads and closer head spacing, leading to losses in signal-to-noise ratio (SNR). Also issues of intertrack-interference become critical. Signal equalization and sequence detection at high linear and track densities requires optimal control of ISI. Adaptive equalization on user data is also very important in order to guarantee best read-channel performance during tape operation and to mitigate variations in the recording channel transfer characteristics.

Read channels for magnetic storage systems may be designed according to one of two basic architectures, an asynchronous architecture and a synchronous architecture. In the synchronous architecture, the analog to digital converter (ADC) is driven by a variable frequency oscillator (VFO) that is usually controlled by a digital timing-recovery unit such that the readback signal is sampled synchronously with respect to the write clock. The synchronous signal samples are first equalized and then provided to the detection circuit. Typically, timing information is extracted from the equalized sample values. Synchronous architectures are not typically used in tape systems.

In read channels having an asynchronous architecture, the ADC converter is driven by a fixed clock with rate 1/T' and the sampling of the readback signal is done asynchronously with respect to the write clock. The synchronization of the signal samples is accomplished digitally using interpolative timing recovery (ITR).

In asynchronous tape drive systems, the read signals are typically shaped towards a partial-response target characteristic. For example, the $(1-D^2)$ Class IV Partial Response (PR4) or the $(1+D-D^2-D^3)$ Extended PR4 (EPR4) polynomials can be used as partial response targets. When implementing maximum-likelihood detection, read channels that employ partial-response signal shaping are referred to as PRML channels.

More general targets for signal shaping are specified by generalized partial response characteristics of the type $(1+g1\ D+g2\ D^2+\ldots gN\ D^N)$, where the coefficients $g_i$, $i=1,\ldots,N$ can assume non-integer values. This approach also allows one to incorporate noise prediction within the equalization/detection function in order to whiten the noise process at the input of the detector and also minimize its energy. Disk drive systems use noise-predictive maximum-likelihood (NPML) detectors to detect a readback signal shaped toward a generalized partial response polynomial target.

SUMMARY

Provided is an asynchronous read channel shaped toward generalized partial response characteristics. The read channel is incorporated in a storage device to process signals read from a storage medium. An equalizer receives asynchronous input read signals and shapes the input read signals toward a desired fixed characteristic in an asynchronous time domain. An interpolator transforms the read signal from the equalizer in the asynchronous time domain to a synchronous time domain. A noise whitening filter processes the read signal shaped toward the desired fixed characteristic to produce an output read signal shaped towards a generalized partial response polynomial. A detector receives the read signal shaped towards the generalized partial response polynomial in the synchronous time domain to determine an output value comprising data represented by the input read signals.

DETAILED DESCRIPTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
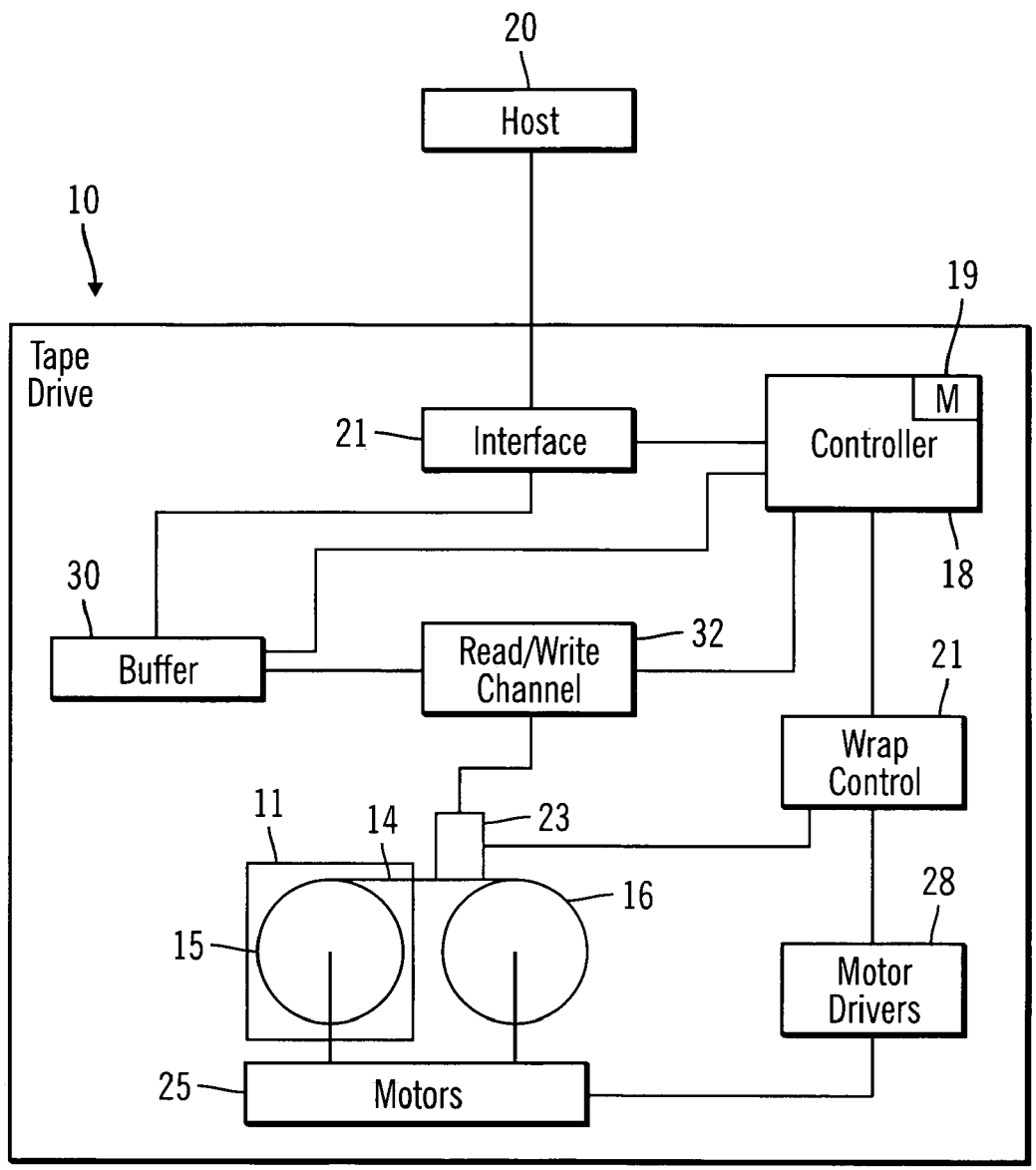
FIG. 1 illustrates an embodiment of a tape drive.

FIG. 1 illustrates an embodiment of a magnetic tape drive 10. The magnetic tape drive provides a means for reading and writing information with respect to a magnetic tape 14 of a magnetic tape cartridge 11. Magnetic tape cartridges include a magnetic tape storage medium to store data to be saved and read at a subsequent time. Further, the magnetic tape cartridges may be interchanged between tape drives, such that a magnetic tape written on one tape drive will be read by another tape drive. The magnetic tape cartridge 11 comprises a length of magnetic tape 14 wound on one or two reels 15, 16.

A single reel magnetic tape cartridge 11 is illustrated, examples of which are those adhering to the Linear Tape Open (LTO) format. An example of a magnetic tape drive 10 is the IBM 3580 Ultrium magnetic tape drive based on LTO technology. A further example of a single reel magnetic tape drive and associated cartridge is the IBM 3592 TotalStorage Enterprise magnetic tape drive and associated magnetic tape cartridge. An example of a dual reel cartridge is the IBM 3570 magnetic tape cartridge and associated drive. In alternative embodiments, additional tape formats that may be used include Digital Linear Tape (DLT), Digital Audio Tape (DAT), etc.

The magnetic tape drive 10 comprises one or more controllers 18 of a recording system for operating the magnetic tape drive in accordance with commands received from a host system 20 received at an interface 21. A controller typically comprises logic and/or one or more microprocessors with a memory 19 for storing information and program information for operating the microprocessor(s). The program information may be supplied to the memory via the interface 21, by an input to the controller 18 such as a floppy or optical disk, or by read from a magnetic tape cartridge, or by any other suitable means. The magnetic tape drive 10 may comprise a standalone unit or comprise a part of a tape library or other subsystem. The magnetic tape drive 10 may be coupled to the host system 20 directly, through a library, or over a network, and employ at interface 21 a Small Computer Systems Interface (SCSI), an optical fiber channel interface, etc. The magnetic tape cartridge 11 may be inserted in the magnetic tape drive 10, and loaded by the magnetic tape drive so that one or more read and/or write heads 23 of the recording system reads and/or writes information in the form of signals with respect to the magnetic tape 14 as the tape is moved longitudinally by two motors 25 which rotate the reels 15, 16. The magnetic tape typically comprises a plurality of parallel tracks, or groups of tracks. In certain tape formats, such as the LTO format, the tracks are arranged in a serpentine back and forth pattern of separate wraps, as is known to those of skill in the art. Also as known to those of skill in the art, the recording system may comprise a wrap control system 27 to electronically switch to another set of read and/or write heads, and/or to seek and move the read and/or write heads 23 laterally on the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatter for data to be read from and written to the magnetic tape, employing a buffer 30 and a read/write channel 32, as is known to those of skill in the art.

The tape drive 10 system further includes motors 25 and reels 15, 16 to move the magnetic tape 14 with respect to the read head(s) 23 such that the read head(s) may detect magnetic signals on the magnetic tape. A read channel of the read/write channel 32 digitally samples the magnetic signals sensed by the read head(s) to provide digital samples of the magnetic signals for further processing.

In described embodiments, the components of the read channel shape the input read signal towards a general partial-response characteristic G(D), which may be expressed in the form $G(D)=F(D) \cdot P(D)$, where D represents the delay operator corresponding to the symbol duration T. Factorization of G(D) into the polynomials F(D) and P(D) allows one to introduce a desired fixed characteristic F(D) and a noise-whitening filter P(D). For example, the target polynomial $G(D)=(1-D^2)(1+p1 \cdot D+p2 \cdot D^2)$ may be used, which introduces the fixed PR4 characteristic $F(D)=1-D^2$, and employs two-coefficient, p1 and p2, noise whitening, as expressed by the factor $P(D)=1+p1\ D+p2\ D^2$.

FIGS. 2, 3, 4, 5, and 6 illustrate embodiments of a portion of a read channel of the read/write channel 32 of FIG. 1. In embodiments where the read channel may concurrently read a plurality of parallel tracks, the read/write channel 32 may comprise a plurality of read channels, in which some of the components may be shared.

Figure 2:
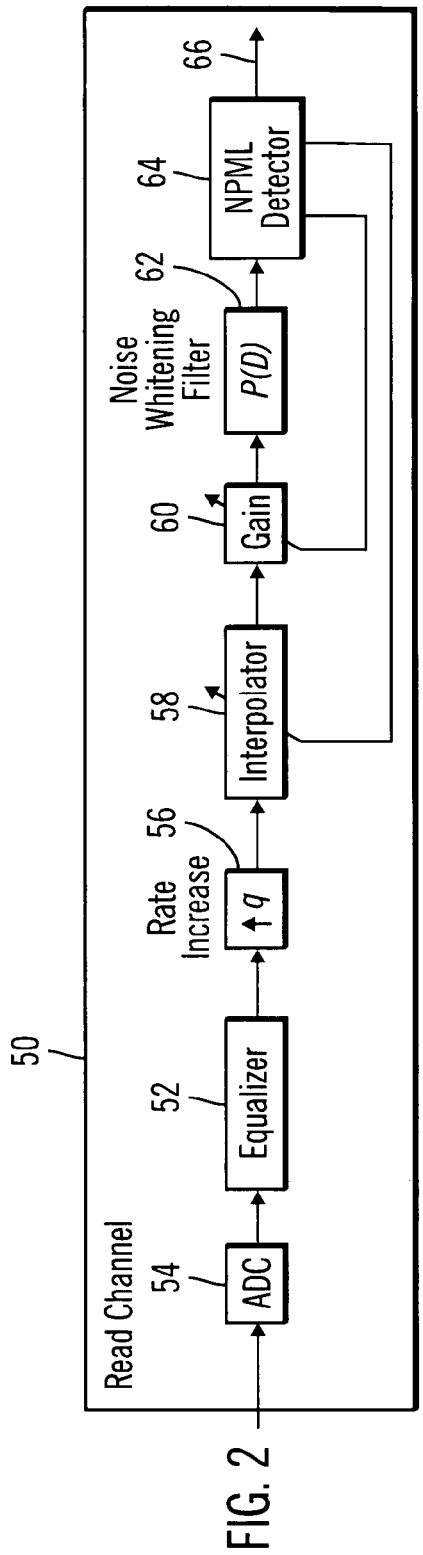
FIGS. 2-6 illustrate embodiments of a read channel in the tape drive.

FIG. 2 illustrates an embodiment of certain, but not all, of the components of a read channel 50 to provide digital samples of the magnetic signals detected by the read head 23. An equalizer 52 receives a readback signal from an analog-to-digital converter (ADC) 54, which converts analog signals read from tape to digital samples in the asynchronous time domain that can be processed by the equalizer 52. The readback signal is sampled employing a clock signal that is free-running at a rate of 1/T' that is usually larger than the rate 1/T, where T denotes the duration of a recorded bit. In one embodiment, the equalizer 52 may comprise a finite impulse response (FIR) filter having adjustable tap coefficients. The equalizer 52 shapes the readback signal towards a desired fixed characteristics F'(D'), where D' represents the delay operator corresponding to the sampling interval T' at the ADC 54 and F'(D') denotes the characteristic F(D) obtained at 1/T' sampling rate. In so doing, the equalizer 52 also filters the digital samples to compensate for differences in the signal due to the magnetic recording properties of the write head, the magnetic tape, and the read head.

The filtered digital samples outputted by the equalizer 52 are supplied to a rate increase unit 56 and then to interpolator 58 The interpolator 58 interpolates the asynchronous samples into a set of samples that can be considered to be synchronous with the write clock or with the positions of the magnetic recording transitions. Hence interpolator 58 adjusts the sampling phase of the input signal and also provides the rate change necessary to achieve the bit rate of 1/T. A gain circuit 60 digitally adjusts the gain of the signals from the interpolator 58 to scale the synchronous samples to optimal levels.

The synchronous signal is then filtered by the noise-whitening filter 62 with characteristic specified by the polynomial P(D). The output of the noise-whitening filter 62 are the read signals shaped toward the target general partial-response polynomial G(D) which are then input to a detector 64 for NPML detection. Further, in the embodiment of FIG. 2, the interpolator 58 and gain circuit 60 may receive the output of the NPML detector 64 as feedback. The NPML detector 64 receives the gain adjusted synchronous digital samples from the noise-whitening filter 62, shaped toward the general partial response polynomial G(D), and determines the data information, or data bits, represented by the digital samples. The detected data bits are outputted as signal 66 for further processing.

In the embodiment of FIG. 2, the signal is first shaped toward the fixed characteristic F(D) in the asynchronous time domain and the noise-whitening filter P(D) is applied in the synchronous time domain to shape the signal toward the general partial response polynomial G(D). In certain embodiments, the output of the equalizer 52 is over sampled by the rate increase unit 56 and the interpolator 58 reduces the sampling rate to the symbol rate in the synchronous time domain.

Figure 3:
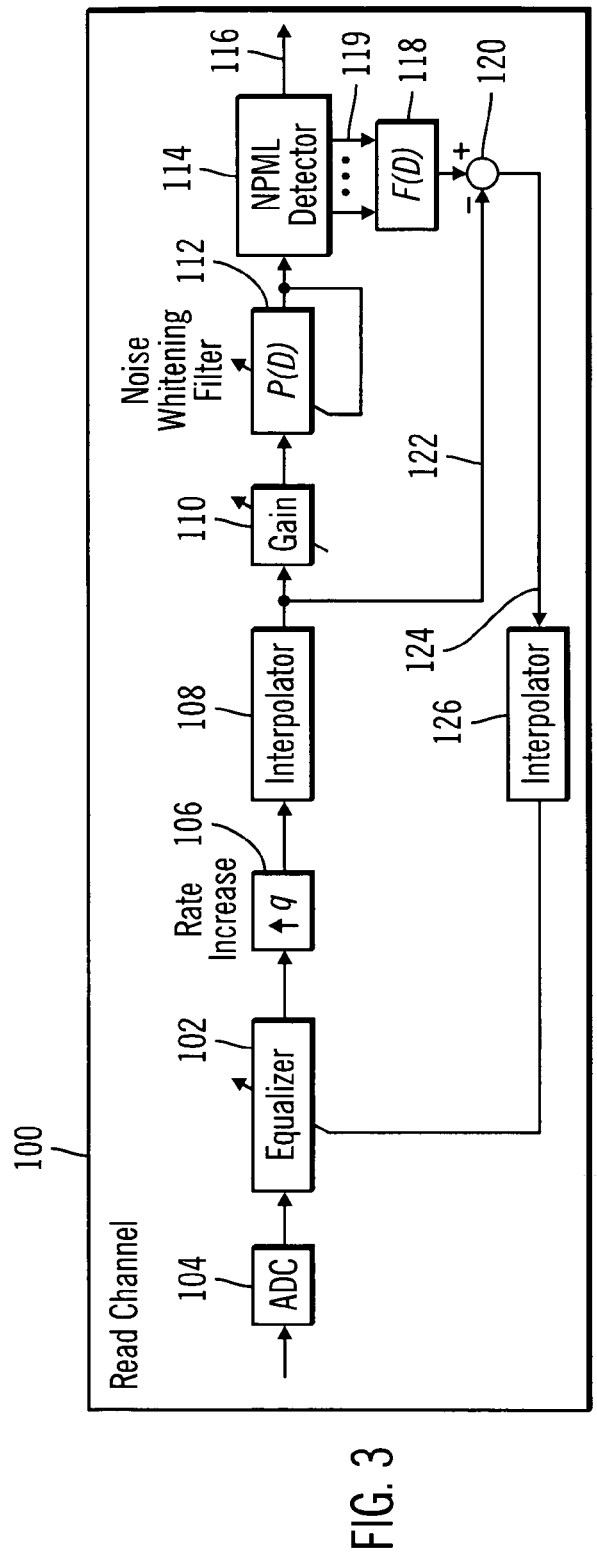

FIG. 3 illustrates an additional embodiment where adaptivity is provided to the read channel of FIG. 2, where the components 52-66 in FIG. 2 are included as components 102-116 in FIG. 3, respectively. The NPML detector generates, in addition to the detected data bits 116, early tentative decisions 119 on the data bits and processes the tentative decisions by a F(D) filter 118. An error 124 is calculated by a difference circuit 120 that takes the difference of the output of the F(D) filter 118 and an output 122 of the interpolator 108, which comprises the synchronous readback signal shaped toward the fixed characteristic F(D). An interpolator 126 transforms the error 124 to the asynchronous time domain and provides it to the equalizer 102. The equalizer 102 uses this interpolated error signal to adapt its coefficients to minimize the error 124.

In one embodiment, the error 124 may be processed by a least mean squares (LMS) computation component to adjust the coefficients used by the equalizer 102. The LMS computation may use the error signal to adjust one or more tap coefficients of the equalizer.

In the embodiment of FIG. 3, the equalizer adjustment loop is decoupled from the gain control loop, so as to avoid drift effects, which could decrease overall performance. Thus, the error signal 124 for the equalizer adjustments is generated as the difference between the signal before gain control and nominal signal levels obtained from tentative decisions from the NPML detector 114. In an alternative embodiment, the noise whitening filter 112 can be placed before the gain control circuit.

Figure 4:
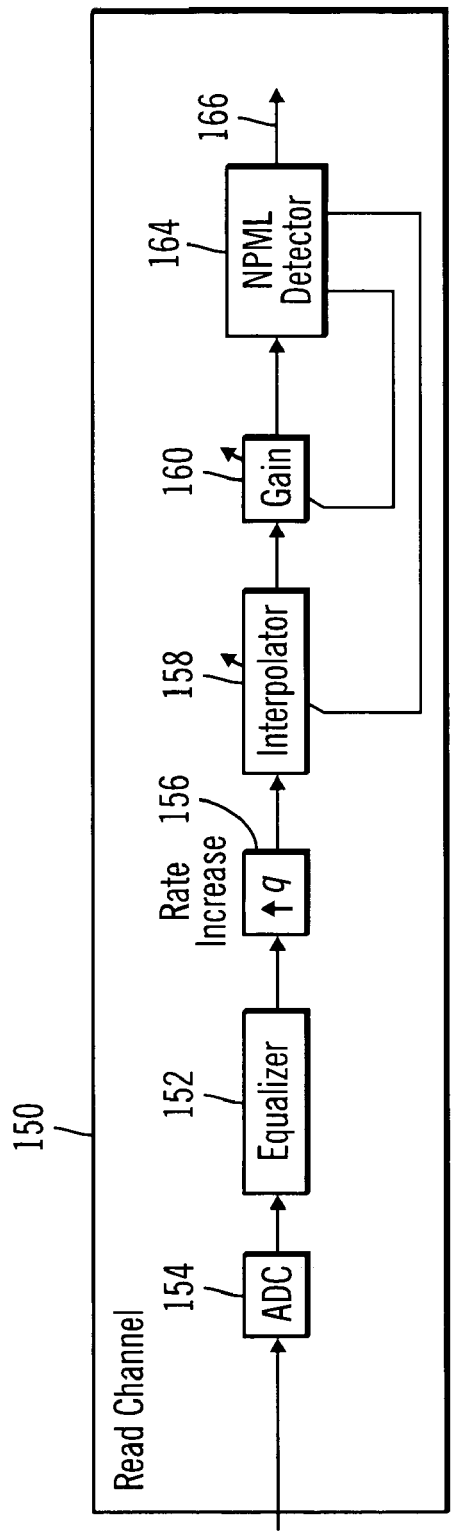

FIG. 4 illustrates an additional embodiment of components in a read channel 150 to provide digital samples of the magnetic signals detected by the read head 23. An equalizer 152 receives a readback signal from an analog-to-digital converter (ADC) 154, which converts analog signals read from tape to digital samples in the asynchronous time domain that can be processed by the equalizer 152. In one embodiment, the equalizer 152 may comprise a finite impulse response (FIR) filter having adjustable tap coefficients. The equalizer 152 shapes the read back signal towards a desired generalized partial response polynomial G(D). In so doing, it filters the digital samples to also compensate for differences in the signal due to the magnetic recording properties of the write head, the magnetic tape, and the read head. Further, the equalizer 152 incorporates the function of a noise whitening filter P(D) to whiten and minimize the variance of the noise process affecting the read back signal. In this way, the overall target characteristic G(D), comprising both the fixed characteristic and noise whitening, is achieved in the asynchronous time domain.

In one embodiment, the equalizer 152 may utilize an analytic solution based on mean square error (MSE) minimization to determine for given fixed characteristic F(D) the filter coefficients according to the following equations (1), (2), and (3):

$$\lambda = \frac{2}{\underline{u}^t(\tilde{R}_{bb} - \tilde{R}_{xb}^t R_{xx}^{-1} \tilde{R}_{xb})^{-1} \underline{u}}, \quad (1)$$

$$\underline{p} = \frac{1}{2}\lambda(\tilde{R}_{bb} - \tilde{R}_{xb}^t R_{xx}^{-1} \tilde{R}_{xb})^{-1} \underline{u}, \quad (2)$$

$$\underline{c} = R_{xx}^{-1} \tilde{R}_{xb} \underline{p}. \quad (3)$$

In the above equations, $\lambda$ comprises a Lagrange multiplier, $\underline{u}=[1\ 0\ \ldots\ 0]^t$ is a $v \times 1$ unit vector, $\tilde{R}_{bb}$ and $\tilde{R}_{xx}$ comprise autocorrelation matrices, $\tilde{R}_{xb}$ comprises a cross-correlation matrix, $\underline{c}=[c_0\ c_1\ \ldots\ c_{N_F-1}]^t$, where superscript t denotes vector transposition, comprises the coefficients of the FIR equalizer, $\underline{p}=[p_0\ p_1\ \ldots\ p_{v-1}]^t$ comprises the coefficients of the noise whitening filter $P(D)=p_0+p_1D+\ldots+p_{v-1}D^{v-1}$.

Figure 5:
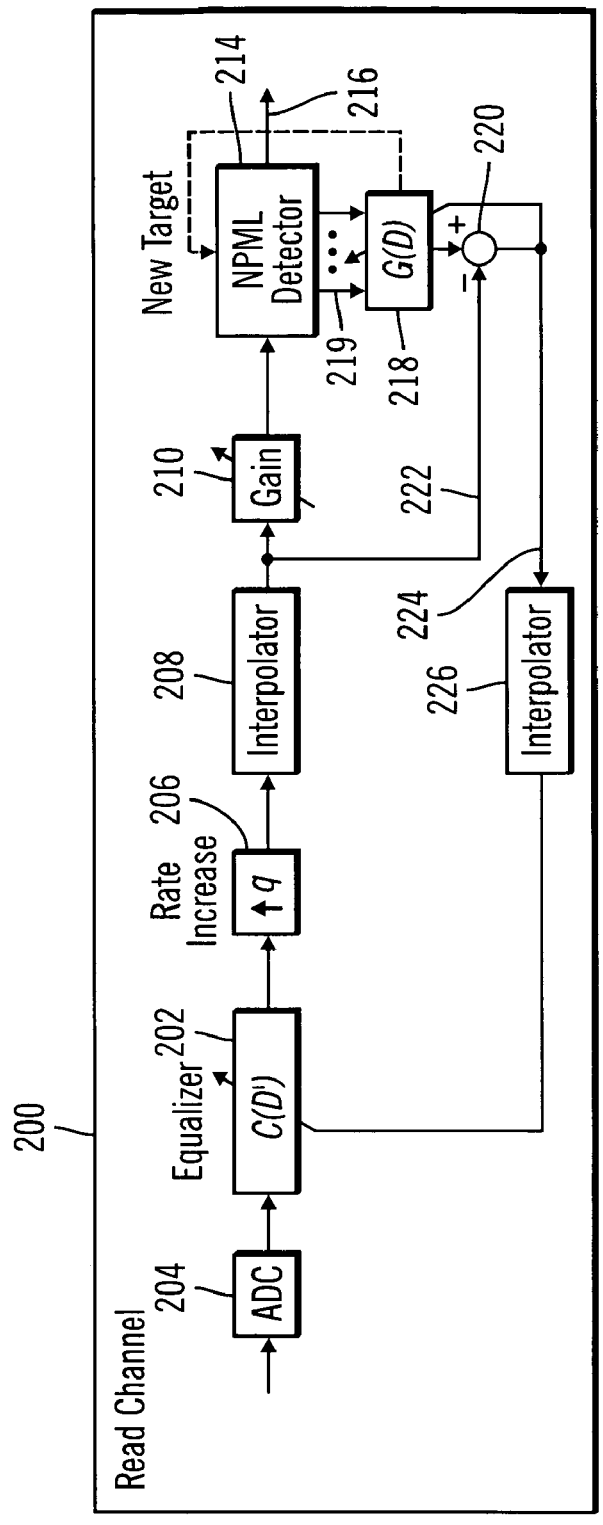

FIG. 5 illustrates a further embodiment of the read channel 150 in FIG. 4 where the equalizer is obtained adaptively by minimizing the error between the signal at the output of interpolator 208 and estimated signals provided by detector 214, where the components 152-166 in FIG. 4 are included as components 202-216 in FIG. 5, respectively. The NPML detector generates, in addition to detected data bits 216, early tentative decisions 219 on the data bits and processes the tentative decisions by a G(D) filter 218. An error 224 is calculated by a difference circuit 220 that takes the difference of the output of the G(D) filter 218 and an output 222 of the interpolator 208, which comprises the synchronous readback signal that must be shaped toward the general partial response characteristic G(D). An interpolator 226 transforms the error 224 to the asynchronous time domain and provides it to the equalizer 202. The equalizer 202 uses this interpolated error signal to filter the readback signal so that the signal 222 at the output of the interpolator 208 is shaped toward the general partial response target G(D).

In one embodiment, the error 224 may be processed by an LMS computation component to adjust the coefficients of the equalizer C(D') in the asynchronous time domain and by another LMS computation component to adjust in the synchronous time domain the coefficients of the noise whitening filter P(D) included in the target characteristic G(D). Because the equalizer 202 taps may be T'-spaced, the error signals 224 are interpolated by the interpolator 226 back to the T'-spaced asynchronous time domain before they can be used for the adjustments of the equalizer 202 coefficients. In certain embodiments, simple linear interpolation may be used for this purpose. Convergence may be achieved by this technique provided that the equalizer is properly initialized, and that the two filters C(D') and P(D) are adjusted in turn, by alternately dwelling a given number of iterations on equalizer adjustments and on noise-whitening filter adjustments. The initial equalizer can, for example, be taken as a conventional zero-forcing or minimum MSE equalizer designed for a $(1-D^2)$ PR4 or a $(1+D-D^2-D^3)$ EPR4 target. Convergence to the all-zero solution is avoided by imposing $p_0=1$ as the first coefficient of the noise whitening filter during LMS updating.

Figure 6:
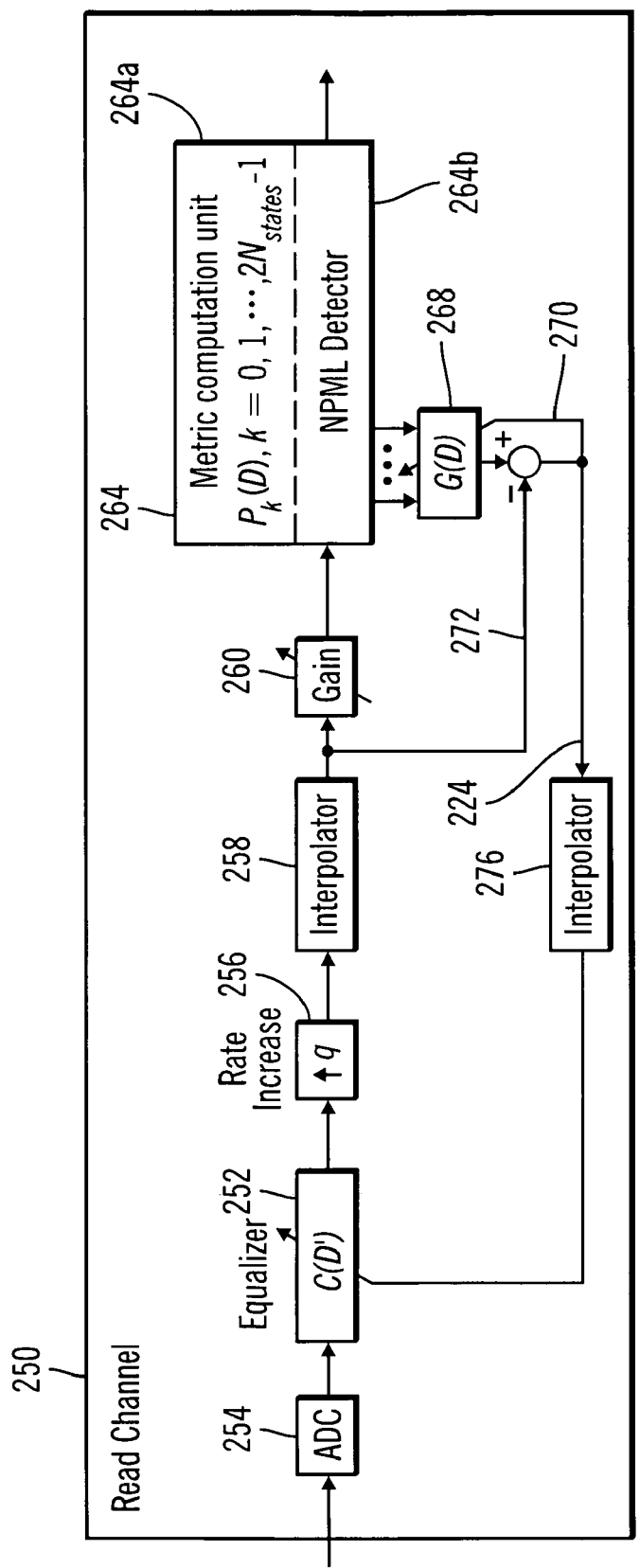

FIG. 6 illustrates a further embodiment of the read channel 200 in FIG. 5, where the components 202-226 in FIG. 5 are included as components 252-276 in FIG. 5, respectively. The NPML detector 264 includes a total of $N_{states}$ states and comprises a metric computation unit 264a that employs a set of noise whitening filters $P_k(D)$, k=0, 1, ..., $2*N_{states-1}$. $P_k(D)$ denotes the noise whitening filter that is used to compute the branch metrics on the kth transition in the NPML trellis. That is, the predictors are embedded into the branch metric computations 264a and every transition is associated to a particular predictor filter. The NPML detector component 264b performs the remaining detection operations. Again the equalizer 252 is adjusted in such a way that it is decoupled from timing and gain adjustments. The read channel 250 of FIG. 6 provides NPML detection in an adaptive and data dependent manner.

Described embodiments provide techniques to shape the readback signal toward a generalized partial response target which whitens the noise process and minimizes its variance.

The described components of the embodiments of the read channel components comprise discrete logic, ASIC (application specific integrated circuit), FPGA (field programmable gate array), custom processors, etc. Implementing the asymmetry cancellation operations in circuits reduces processing burdens on the controller 19 and other processors in the tape drive 10.

The described components of the read channel embodiments in FIGS. 2-6 and their operations may also be implemented in subroutines in programs or other software implementations executed by a processor. Such programs implementing the operations of the read channel components shown in FIGS. 2-6 may be implemented in a computer readable medium, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

Components in FIGS. 2-6 shown as separate components may be implemented in a single circuit device or functions of one illustrated component may be implemented in separate circuit devices.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing signals read from a storage medium, comprising:
   receiving asynchronous input read signals and shaping the input read signals toward a desired fixed characteristic in an asynchronous time domain;
   transforming the read signal shaped toward the desired fixed characteristic in the asynchronous time domain to a synchronous time domain;
   applying a noise whitening filter in the asynchronous time domain to the read signal shaped toward the desired fixed characteristic to produce an output read signal shaped towards a generalized partial response polynomial; and
   receiving the read signal shaped towards the generalized partial response polynomial in the synchronous time domain to determine an output value comprising data represented by the input read signals, wherein the read signal shaped toward the generalized partial response polynomial is transformed to the synchronous time domain.

2. The method of claim 1, wherein the noise whitening filter is applied after the read signal shaped toward the desired fixed characteristic is transformed to the synchronous time domain.

3. The method of claim 1 further comprising:
   determining an error comprising a difference of a signal estimate obtained by filtering the read signal shaped toward the generalized partial response polynomial and the input read signal that is shaped toward the generalized partial response polynomial, wherein the error is used to adjust coefficients used to shape the input read signal to minimize the error.

4. The method of claim 3, wherein an asynchronous error signal is used to adjust the equalizer coefficients used to minimize the error.

5. The method of claim 3, wherein the error is also provided to adjust in the synchronous time domain the coefficients of the noise whitening filter to minimize the error.

6. The method of claim 3, wherein the output value is determined using data dependent detection.

7. The method of claim 1, wherein the generalized response polynomial is a product of the fixed characteristic comprising a polynomial and the noise whitening filter comprising a polynomial.

8. A method for processing signals read from a storage medium, comprising:
   receiving asynchronous input read signals and shaping the input read signals toward a desired fixed characteristic in an asynchronous time domain;
   transforming the read signal shaped toward the desired fixed characteristic in the asynchronous time domain to a synchronous time domain;
   applying a noise whitening filter to the read signal shaped toward the desired fixed characteristic to produce an output read signal shaped towards a generalized partial response polynomial;
   receiving the read signal shaped towards the generalized partial response polynomial in the synchronous time domain to determine an output value comprising data represented by the input read signals; and
   determining an error comprising a difference of a signal estimate obtained by filtering the read signal shaped toward the fixed characteristic and a read signal before being processed by the noise whitening filter, wherein the error is used to adjust coefficients used to shape the input read signal towards the fixed characteristic to minimize the error with respect to the signal estimate.

9. The method of claim 8, wherein an asynchronous error signal is used to adjust the coefficients used to shape the input read signals toward the fixed characteristic.

* * * * *